United States Patent [19]

Jackson et al.

[11] Patent Number: 4,980,542

[45] Date of Patent: Dec. 25, 1990

[54] POSTAL CHARGE ACCOUNTING SYSTEM

[75] Inventors: Winslow E. Jackson, Monroe; Paul H. K. Kim; Robert K. T. Chen, both of Wilton; Joseph L. Gargiulo, Trumbull; Robert Durst, Monroe; Wojciech M. Chrosny, Milford, all of Conn.

[73] Assignee: Pitney Bowes Inc., Stamford, Conn.

[21] Appl. No.: 437,789

[22] Filed: Nov. 15, 1989

Related U.S. Application Data

[63] Continuation of Ser. No. 153,396, Feb. 8, 1988, abandoned.

[51] Int. Cl.[5] .............................................. G06F 15/20

[52] U.S. Cl. .................................... 235/375; 235/383; 235/492

[58] Field of Search ........................ 235/375, 383, 492; 380/23; 364/464.02, 464.03

[56] References Cited

U.S. PATENT DOCUMENTS

| | | | |
|---|---|---|---|
| 4,218,011 | 8/1980 | Simjian | 235/375 |
| 4,629,871 | 12/1986 | Scibner | 235/375 |
| 4,802,218 | 1/1989 | Wright | 235/375 |

FOREIGN PATENT DOCUMENTS

| | | |
|---|---|---|
| 0207492 | 1/1987 | European Pat. Off. . |
| 0208231 | 1/1987 | European Pat. Off. . |
| 240360 | 10/1986 | Japan . |
| 240369 | 10/1986 | Japan . |
| 172493 | 7/1987 | Japan . |
| 2173738A | 4/1985 | United Kingdom . |

*Primary Examiner*—Harold Pitts
*Attorney, Agent, or Firm*—Charles R. Malandra, Jr.; Melvin J. Scolnick; David E. Pitchenik

[57] ABSTRACT

A postage meter accounting system is provided having a user terminal which interfaces with and controls an electronic postage meter. The user terminal is also connected to an integrated circuit card read-write unit for receiving user, administrator, service and/or program integrated circuit cards. The user terminal activates and permits use of the meter upon presentation of a valid user card, storages postage meter use information and transmits the postage meter use information to the user card for storage in a user card transaction table. The postage meter use information stored in the user terminal and in user card memory may be accessed for later reference on a user terminal display and/or printer. Preferably, an administrative computer is provided for periodically receiving all postage meter use information from the user cards or, alternatively, directly from the user terminal to generate one or more postage meter use accounting reports. The administrator card permits access to and revision of user card memory, postage meter use information and owner-variable user terminal application program information. The service card permits access to and revision of administrator card memory and all user terminal application program information. Program cards facilitate application program loading and revision.

31 Claims, 6 Drawing Sheets

52—DEPARTMENT 123 - CREDIT CONTROL
54—PERIOD OCTOBER 1986

| 56—PRINT VALUE | 58—QUANTITY | 60—VALUE |
|---|---|---|
| .12 | 10 | 1.20 |
| .17 | 20 | 3.40 |
| .18 | 3 | .54 |
| .22 | 4 | .88 |
| OTHER | 7 | 4.92 |
| 62—TOTAL | 62—44 | 62—10.94 |

FIG. 5

52—DEPARTMENT 123 - CREDIT CONTROL

| 64—DATE | 66—QUANTITY | 68—VALUE |
|---|---|---|
| 10/1/86 | 14 | 3.10 |
| 10/2/86 | 7 | 1.19 |
| . | . | . |
| . | . | . |
| . | . | . |
| 10/31/86 | 12 | 1.94 |
| 70—PERIOD (OCT.) | 137 | 25.54 |

FIG. 6

52—DEPARTMENT 123 - CREDIT CONTROL

| 72—DATE | 74—.12 QTY. | 76—.17 QTY. | 78—OTHER QTY. | TOTAL—80 VALUE |
|---|---|---|---|---|
| 10/1/86 | 4 | 3 | 0 | 0.99 |
| 10/2/86 | 5 | 10 | 1 | 3.30 |
| . | . | . | . | . |
| . | . | . | . | . |
| . | . | . | . | . |
| 10/31/86 | 2 | 7 | 0 | 1.43 |
| 70—PERIOD (OCT.) | 137 | 48 | 10 | 31.80 |
| 82—Y TO D | 1031 | | | 298.40 |

FIG. 7

POSTAL CHARGE ACCOUNTING SYSTEM

This application is a continuation, of application Ser. No. 153,396, filed Feb. 8, 1988, now abandoned.

TECHNICAL FIELD

This invention relates to electronic postage meter systems and, more particularly, to a multiple smart card accounting system for use with electronic postage meters.

BACKGROUND AND OBJECTS OF THE INVENTION

A postage meter typically includes a printer to print postage indicia on a mail piece and a so-called vault for securely holding the postage meter funds. Ascending and descending registers are provided within the vault to record total postage meter usage and remaining funds, respectively. The vault is securely connected to the printer so that any use of the meter to print postage will be added to the ascending register to increase the record of total life cycle meter usage and will be charged against the descending register to reduce the amount of available funds remaining. The vault is recharged in a known manner, as by being taken to authorized postal authorities to have the descending register reset to reflect a corresponding payment.

Extensive effort has heretofore been made to ensure the security of the postal funds within the vault. Thus, many alternative vault recharging systems have been proposed and extensive efforts have been directed at ensuring that postage cannot be fraudulently or accidentally printed without being charged to the ascending and descending registers within the vault. See, for example, U.S. Pat. No. 4,218,011 entitled "Coupon Controlled Metering Device," U.S. Pat. No. 4,629,871 entitled "Electronic Postage Meter System Settable By Means of a Remotely Generated Input Device," United Kingdom Pat. No. 2,173,738A entitled "Secure Transport of Information Between Electronic Stations," Japanese patent disclosure Nos. 1986-[Showa-61]-240,360 and 1986-[Showa 61]-240,369 both entitled "Postage Processing Machine," and Japanese public disclosure no. 172493/1987 entitled "Mail Charge Processing Apparatus." However, no significant effort has heretofore been directed to accounting for postage meter use other than to provide the cumulative information recorded in the ascending and descending meter registers as to total life cycle meter usage and available funds remaining. Thus, where a single postage meter is used by several persons or departments there is no convenient method of accurately accounting for meter usage for internal accounting purposes.

A proposed system for controlling a network of postage meters is disclosed in European Patent Application No. 86108929.0 of SMH Alcatel Ltd. entitled "Process and System for Controlling Postage Meters," published Jan. 7, 1987 under publication No. 0,207,492. The SMH Alcatel System provides an indication of total usage and funds remaining in the vault but does not appear to be capable of providing a more detailed analysis of meter usage. In addition, the SMH Alcatel System cannot readily be retrofitted to existing postage meters. In short, the SMH Alcatel system does not provide a satisfactory postage meter accounting system. Similar systems are disclosed in some of the previously mentioned British and Japanese patent disclosure documents. A similar system not involving use of integrated circuit cards is disclosed in an SMH Alcatel European Patent Application No. 86108930.8 published on Jan. 14, 1987 under Publication No. 0,208,231 entitled "Remote Control System for Postage Meters."

Therefore, it is one object of the present invention to provide a convenient postal charge accounting system.

It is another object of the present invention to provide a convenient postal charge accounting system which can be used in conjunction with the existing security features of an electronic postage meter.

It is yet a further object of the present invention to provide a postal charge accounting system which may be retrofitted to existing electronic postage meters in the field.

Another object of the invention is to provide a postal charge accounting system which provides detailed departmental accounting.

These and other highly desirable objects and advantages are obtained in the convenient yet secure postal charge accounting system according to the present invention.

Objects and advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

In accordance with the present invention, a postage meter charge accounting system is provided in which a user terminal is connected to an electronic postage meter. The user terminal includes a card read-write unit adapted to receive one or more integrated circuit cards having non-volatile memory and a microprocessor (so called "smart cards"). The user terminal inhibits operation of the postage meter unless a valid smart card designated for use with the user terminal and, hence, the corresponding meter is placed in the card read-write unit. The user smart card receives a signal from the user terminal indicating the postage value setting from the meter and a confirmation that the postage value has been printed. The smart card sorts, collates, and stores this information as to monetary amount and quantity of particular items of postage printed in a predetermined manner for later display and/or printing. Preferably, one user smart card is provided to each account having access to the meter, such as each of several corporate departments, so that departmental postage meter use can be monitored. The user terminal retains in memory a corresponding record of all meter usage information stored in each user card, as well as a user terminal ascending meter register value. In the preferred embodiment an administrator smart card is provided for activating user smart cards and for other administrative purposes. A service card having global authority and access greater than either the user or administration cards and one or more program loading cards may also be provided.

In addition, it is contemplated that an administrative computer could be provided. The administrative computer could be connected directly to the user terminal or could be a stand-alone unit connected to a dedicated card read-write unit. The administrative computer would be programmed to provide detailed periodic summary accounting information in any of several different formats.

In operation, user cards dedicated for use with a particular postage meter are assigned to users of postage meter services. For example, user cards could be distributed to several internal corporate departments that share a given postage meter. To activate the postage meter a user places a card in the user terminal read-write unit and, if necessary, enters an identification code into the control unit keyboard in a known manner. After confirming that the card is valid for use with the postage meter the user terminal activates the postage meter.

Preferably, the user terminal interrogates the meter as to the meter ascending register value and compares the meter value to a corresponding value maintained in the user terminal. In this manner any unauthorized meter use, such as by tampering with the meter or the meter-to-user terminal interface, will be detected. Should a discrepancy in values arise the user terminal will require, prior to permitting meter use, identification of an account to be charged with the amount of the discrepancy. This may require administrator intervention.

Through appropriate interfaces the user terminal interrogates the postage meter for postage value setting information and then for confirmation that postage of corresponding value has been printed. This postage meter use information is stored by the user terminal and is passed on to the user card which sorts, collates and stores the postage meter use information in a preset format appropriate for the user's needs. Should communications between the user terminal and the postage meter be disrupted prior to receipt of the confirmation signal, such as might be caused by interface tampering, the postage value setting information may nonetheless be stored and transmitted to the user card. The card may be left in the card read-write unit to collect information throughout a given mail processing session, and is removed at the end of the session. Upon removal of the card the user terminal disables the meter until another valid smart card is placed in the read-write unit.

Through the user terminal keyboard the user may request customer select options including a display of the postal use information stored on the card. If the user terminal is provided with a printer a transaction receipt may be obtained. The administrator, using the administrator card, can request a printout of cumulative meter usage information for all meter users. Where postage meter use information is printed at the end of a given accounting period, the user terminal and user cards are preferably reset by the administrator to commence the next accounting period.

In the alternative embodiments including an administrative computer it is contemplated that the information stored in the user cards may be read from the cards and written into the memory of the administrative computer. Alternatively, it is contemplated that the administrative computer could be connected to the user terminal to obtain postage meter use information directly from the user terminal memory. Thus, in these embodiments all postage meter use information would periodically be transferred to the administrative computer either directly from the user terminal memory or by reading the user cards. Preferably, this transfer occurs at the end of a predetermined accounting period, with the user cards being cleared at the same time to commence the next accounting period. In this manner the administrative computer obtains a record of all postage meter use during the accounting period.

It is further contemplated that computer software would be provided to enable the administrative computer to display and/or print the postage meter use information in a variety of formats. By way of example only, the administrative computer could display and/or print demographics of postage meter use for each card holder, i.e. department, during the accounting period. This might include details of daily meter use, the quantity of particular postage values printed on a daily or period basis, or total meter usage by day or period.

Where no direct link is provided between the user terminal and administrative computer, it is contemplated that the administrator card could be used to monitor comprehensive "item count" and "total setting" meter values at the beginning and end of each accounting period. These values could then be cross-checked against the cumulative information collected from the cards in order to ensure that the card system has accounted for all postage meter use in a given accounting period.

Since the vault remains at all times within the postage meter the user terminal and associated card read-write unit of the present invention advantageously can be retro-fitted to existing electronic postage meters through any appropriate communications link. Of course, it is contemplated that future electronic meters could be designed and built to include the user terminal and card read-write unit in one integrated structure. However, since the traditional vault-printer meter arrangement is always maintained, the postage meter accounting system according to the invention should comply with existing regulatory provisions in either case.

Thus, the present invention obtains a postal charge accounting system which provides departmental accounting for postage meter use. In addition, the system according to the present invention advantageously can be retro-fitted to existing electronic postage meters and can be adapted to include an administrative computer to generate comprehensive accounting reports.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and together with the description serve to explain the principles of the invention, in which:

FIG. 5 is a first example of a postage meter accounting report;

FIG. 6 is a second example of a postage meter accounting report;

FIG. 7 is a third example of a postage meter accounting report; and

DETAILED DESCRIPTION OF THE PREFERRED EMBODIMENTS

Figure 1:
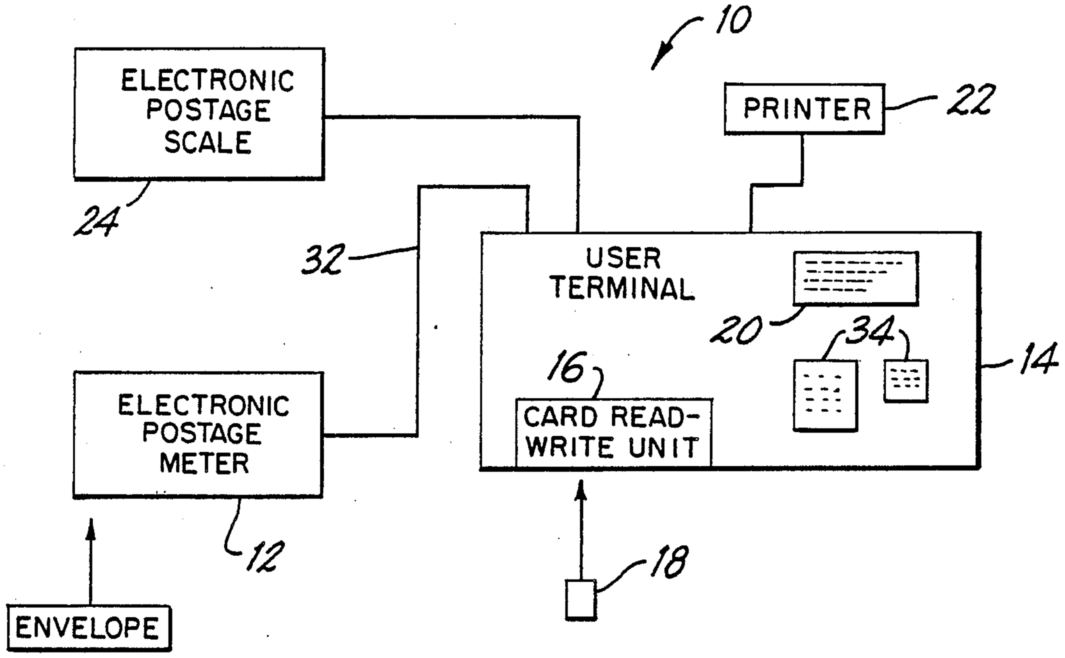
FIG. 1 is a schematic block diagram of a postage meter accounting system in accordance with the invention.

Referring now to the drawings, there is shown in schematic block diagram form a postal charge accounting system 10 in accordance with the invention having an electronic postage meter 12 connected to a user terminal 14. The user terminal is provided with a card read-write unit 16 for receiving integrated circuit or so-called ¢smart" cards 18. In accordance with the invention user cards dedicated for use with a single postage meter are distributed among authorized users of postage meter 12. Postage meter use information is stored on cards 18 and in memory of user terminal 14 and may be displayed on the user terminal display 20 or on optional user terminal printer 22, as desired. An optional electronic postage scale 24 may also be provided. In the first alternative embodiment shown in FIG. 2, the system according to the invention further includes an optional administrative computer 26 connected to user terminal 14 to receive postage meter use information directly from the user terminal. A second alternative embodiment is shown in FIG. 3, wherein administrative computer 26 is a stand-alone unit connected to a dedicated card read-write unit 28. An optional computer printer 30 associated with computer 26 may provide printed accounting reports generated by computer 26 in formats such as illustrated in FIGS. 5 through 7.

Referring more specifically to FIG. 1, an electronic postage meter 12 is electronically connected to user terminal 14 in a known manner by communications link 32. Examples of electronic postage meters appropriate for use with the present invention include electronic postage meters available from the assignee of the present application, Pitney Bowes, Inc. of Stamford Conn., under the model designation numbers 6500, 6900 or A900. Advantageously, the foregoing postage meters may be incorporated into the present system without modification. Preferably, the postage meter display is electronically disabled and all user functions and information display are conducted through the user terminal keyboard 34 and display 20. In the embodiment shown in FIG. 1, user terminal 14 is connected to postage meter 12 and is provided with an integrated circuit card read-write unit 16 for receiving and interacting with a set of integrated circuit cards 18. The system according to the present invention may optionally include an electronic postage scale 24 and/or a local user terminal printer 22, also connected to the user terminal. The preferred integrated circuit card is a non-contact integrated circuit card available from General Electric Corporation, such as the GEC CT-30. Advantageously, the General Electric smart card may readily be supplemented with a clock for monitoring dates and times of system access and security features useful in the present invention for restricting use of the postage meter to designated accountable entities, e.g. specific persons or corporate departments, and/or for restricting use of any given card to a specified postage meter. In addition, the General Electric smart card advantageously derives its power from the card read-write unit during reading and writing. In addition to the user smart cards there is provided at least one administrator card having supervisory authority over the user cards and at least a portion of the user terminal memory for resetting purposes and for customer option selections. Service representative cards having still further access and authority and program load cards may also be provided. Appropriate smart card read-write units are available from the smart card manufacturer.

Preferably, the smart card memory is programmed to include a "header section" and a "transaction table". The header section includes a smart card identification serial number, the user personal identification number assigned by the administrator, an identification of the type of smart card, i.e. user, administrator, program or service, appropriate custom feature flags, a user terminal identification number, accounting period beginning and ending dates, a debit limit, a budget amount, a usage counter, any applicable error type register and counter, and one or more postage item value column entries. In accordance with the invention, the budget amount would be a warning value and the debit limit would be a maximum authorization value beyond which postage meter use will not be permitted. Budget and debit limit activation and value selection are contemplated as customer options and would be implemented by the administrator using the administrator card. Custom feature flags might include a personal identification number (PIN) active flag indicating that an identification number must be used, a debit limit active flag, a card locked flag, a day time only mode flag for restricting the time of day when a card may be used, a tamper protection flag for indicating three unsuccessful attempts to access the system, a single terminal identification flag and a receipt request flag. By way of example, the user "card locked" flag would be activated when the debit limit is reached or after three unsuccessful attempts to access the system. Administrator intervention would be required to unlock the card.

Typist pick up first line of this page date, one or more postage item value counters, piece counters for other type values and an amount register for recording the amount of such other item values. "Other type" here refers to any postage value not corresponding to a preset postage item value. The number of lines of entry to the transaction table may equal the number of days in any given accounting period.

The administrator smart card includes a header section identical to the user smart card except that the fields defining the accounting period, debit limit, budget amount and postage selection values are not accessible. The administrator card transaction trace records the date of use, the type of service performed and service data for each use. The administrator smart card permits the administrator to reset the user cards, e.g. by initiating or changing a user personal identification code, clearing a locked user card, setting debit and budget amounts or clearing the user card transaction table at the end of an accounting period. The administrator smart card also permits the administrator to display and/or print out postage meter accounting data stored in the user terminal memory and, where appropriate, to load system programs. Information on the administrator card can only be changed using a valid service card which gives the manufacturer's representative full system access.

Finally, it is contemplated that one or more program load cards may be provided to load software to the user terminal. Program load cards can be used during system start up to program the user terminal and, in addition, could be used to conveniently update programming in the field. The header section of the program load card memory includes a card identification number, a personal identification number, an identification of the card as a program load card, the number of program load cards in a set and the sequence number of the particular card in the set. The card also includes data as to the program load version number, the date of release, application information, data as to the card address range, checksum, number of data records in the card, and software program data for each record.

The user terminal includes a microprocessor, preferably of the 16 bit internal—8 bit external variety, approximately 128k bytes of Erasable Programmable Read Only Memory (EPROM), and approximately 64k bytes of non-volatile read-write memory. The microprocessor controls the user terminal functions and the EPROM stores non-customer variable application program information. The non-volatile read-write memory stores accounting data for all users and any customer variable portion of the application program. Of course, the user terminal also includes a battery-backed calendar chip, the smart card read-write unit, a keyboard having numeric and function keys, an alphanumeric display of at least two and preferably four lines, and interface chips and circuitry for communicating with all interconnected devices. The user terminal may also include a beeper for audio feedback when a card is inserted, a key has been pressed, an error has occurred, or the like.

The user terminal memory includes a system configuration table, a summary transaction table for each user, running summary accounting totals, accounting period information, postage item values, postage meter data and terminal status information.

The system configuration table includes identification of the number of user cards assigned to the user terminal and, for each user, the user identification code, card serial number, user type identifier and an optional department number. The system configuration table also includes a country code, identification of local printer characteristics, a printer receipt option flag, identification of meter and electronic scale types, and software version number.

The user terminal summary transaction table stores, for each user, the total value and piece count of postage printed during the current postage printing session.

The user terminal running summary accounting totals include aggregate postage spent and piece count totals for all user accounts during the accounting period.

The user terminal accounting period and item value information includes the accounting period beginning and ending dates and the number and value of postage selection values to be collated in the user cards.

The postage meter data stored in the user terminal includes the initial value of the postage meter ascending register at the beginning of the accounting period, the initial mail piece count, and the current value of the ascending register. The user terminal status information includes a user identification number error flag, an ascending register error flag, an ascending register discrepancy register and a period reset amount register.

In practice, a set of user cards dedicated for use with a given user terminal 14 and electronic postage meter 12 are distributed to those accountable entities authorized to use postage meter 12. To use the meter, a user places a user card 18 into the card read-write unit 16 and enters a personal identification code into keyboard 34 of user terminal 14. User terminal 14 confirms that the smart card disposed in the read-write unit is designated for use with postage meter 12 and that the proper optional personal identification number has been entered onto keyboard 34. Preferably, a combination code system is used in a known manner to provide added security. Principles of postage meter security are discussed in the foregoing U.S. Pat. No. 4,629,871. Upon confirming that the smart card is authorized for use with meter 12 and that the appropriate identification code has been entered on keyboard 34, user terminal 14 electronically activates meter 12 for use. In the absence of an authorized smart card, user terminal 14 electronically deactivates meter 12.

The user terminal controls the postage printing transaction by (i) monitoring the postage value setting of the postage meter; (ii) confirming, where appropriate, that sufficient funds are authorized for use by the card holder; (iii) charging the desired transaction to user terminal and smart card memory and, perhaps, to the administrative computer memory; and (iv) authorizing the postage meter to execute the transaction.

Figure 4:
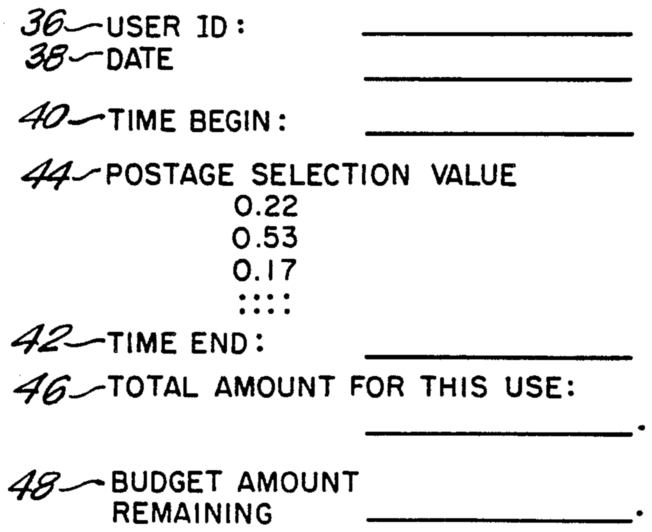
FIG. 4 is an example of a user transaction receipt.

It is also contemplated that optional electronic postage scale 24 could transmit the required postage value of a given item to be posted to user terminal 14, where the availability of authorized funds for the particular account are confirmed. The postage value from meter 24 might be shown on user terminal display 20 and user terminal 14 may be programmed so that the user merely confirms on keyboard 34 that postage indicia corresponding to the displayed postage information is to be printed. After such user confirmation the user terminal could electronically authorize the meter to print the corresponding postage indicia. Optional local printer 22 connected to user terminal 14 may provide a record of postage transactions. An example of a user transaction receipt is shown in FIG. 4. As there shown, the transaction receipt preferably indicates the user identification number 36, the date 38, the transaction starting and ending times 40, 42, a column 44 of postage selection values printed, the total amount of postage printed 46 and the user's remaining budget amount 48.

Advantageously, at the beginning of each postage printing session and after each transaction user terminal 14 receives from meter 12 the value of the ascending meter register. The user terminal confirms that the current meter ascending register value is consistent with the corresponding user terminal value determined by adding the initial ascending register value to the postage spent aggregate, the period reset register and the ascending register discrepancy register. Should a discrepancy occur between the meter ascending register and the calculated user terminal ascending register value due, for example, to accidental or intentional disruption of communication link 32, the user terminal may lock the meter and user card and alert the user that unauthorized postage has been printed. The user terminal may request identification of an account to be charged for the discrepancy and may call for administrator intervention. The administrator may clear the terminal and add the discrepancy to the ascending register discrepancy register. The period reset register includes any residual postage spent which was not accounted for at the end of the previous accounting period, i.e. should one or more user cards not be returned for timely clearing.

During the postage printing session the postage meter prints postage indicia in the normal fashion with the appropriate data entries being made in a traditional manner to the ascending and descending registers in the meter vault. In addition, during each postage printing transaction the postage meter use information, e.g. the value and quantity of postage items printed, is retained in non-volatile user terminal memory to update the aggregate postage spent and piece count values, the user summary transaction table and the appropriate item value counters. The postage meter use information is also transmitted to card 18 disposed in card read-write unit 16. The card sorts, collates and stores the information in the user card transaction table. The card may be left in card read-write unit 16 throughout the postage processing session to record the value and quantity of all items of postage processed. Upon removal of the card from read-write unit 16 user terminal 14 deactivates meter 12.

Since sufficient details of postage meter use by each user are retained in non-volatile user terminal memory, the postage meter use information may be accessed from the user terminal for display and/or printing. In the embodiment shown in FIG. 1 the user terminal memory would be accessed by the administrator using the administrator card to print summary reports on local printer 22.

Figure 2:
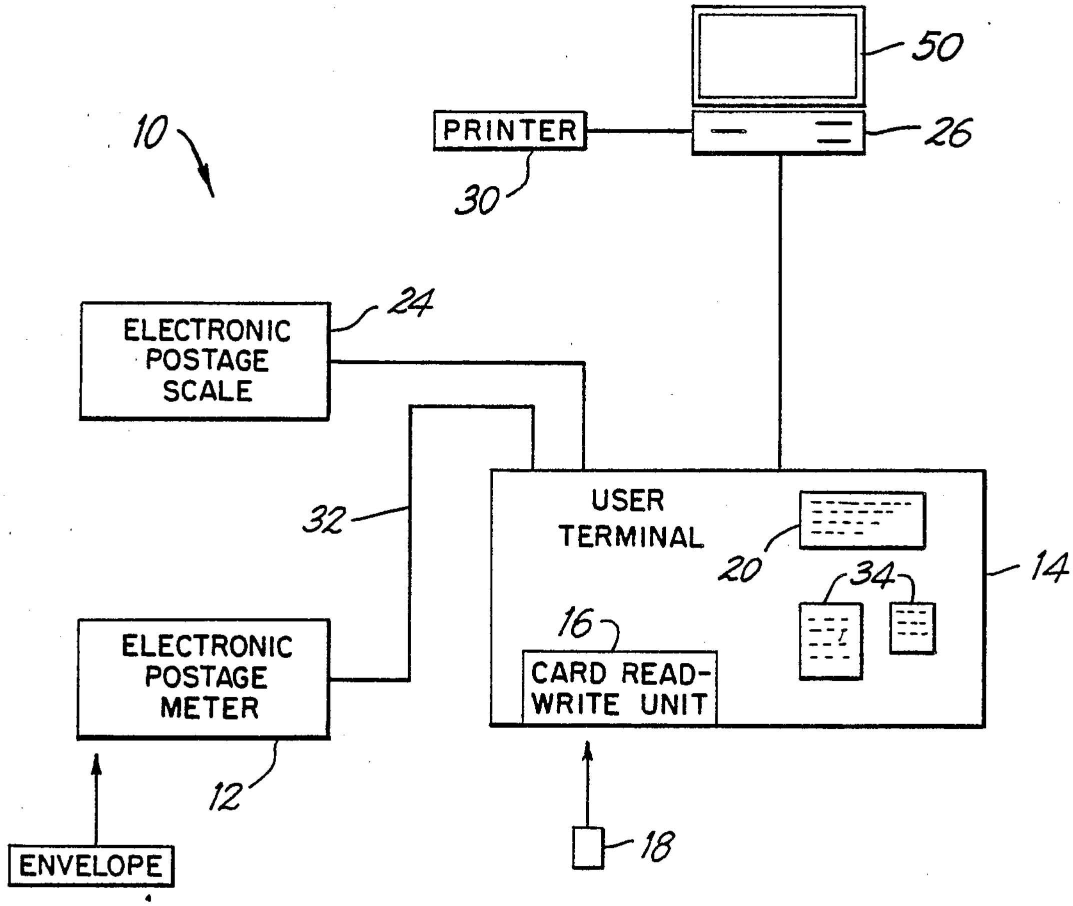
FIG. 2 is a schematic block diagram of a first alternative embodiment of the postage meter accounting system in accordance with the invention including an administrative computer system connected to the user terminal.
Figure 3:
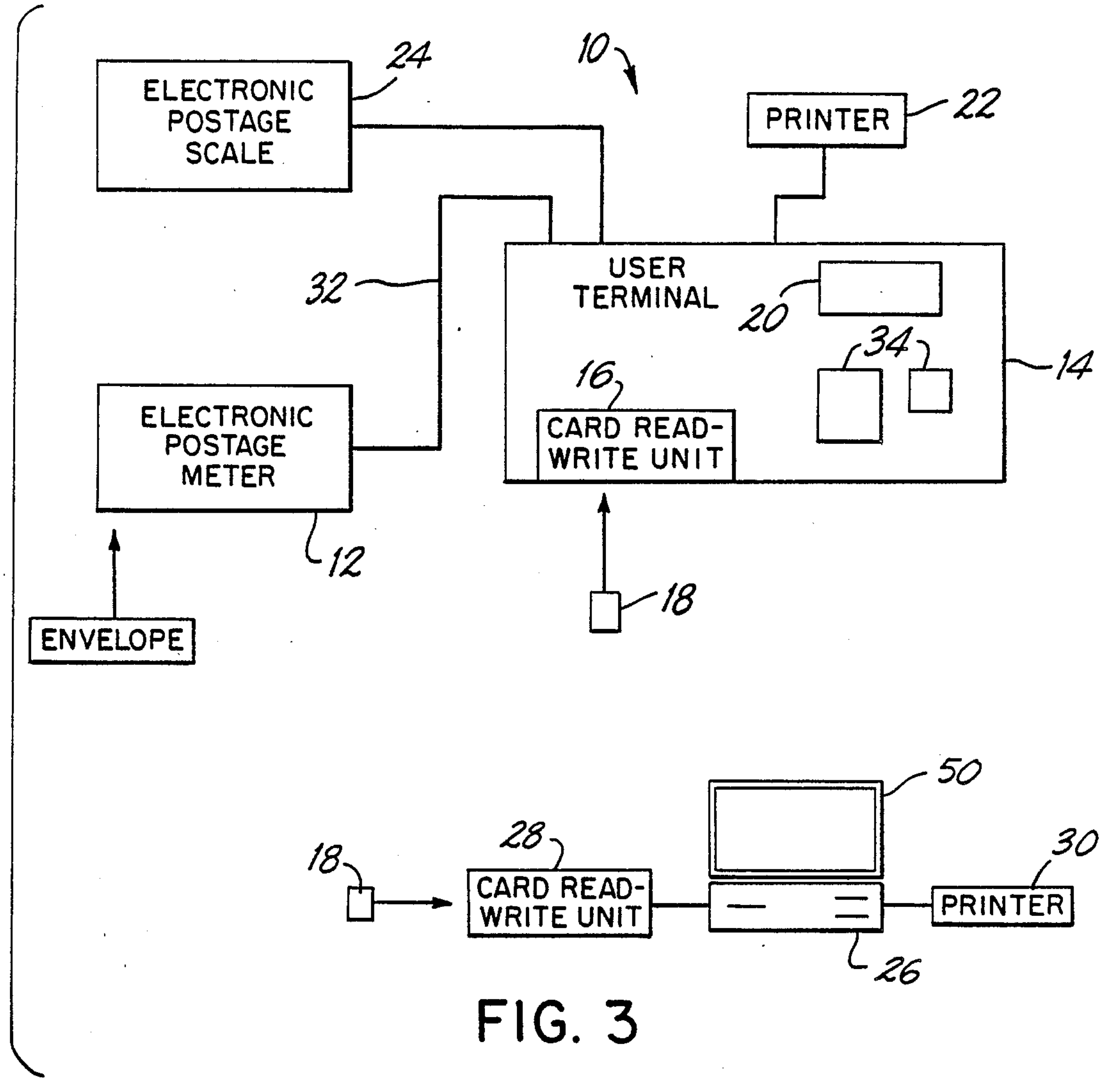
FIG. 3 is a schematic block diagram of a second alternative embodiment of the postage meter accounting system in accordance with the invention including a stand-alone administrative computer system.

Alternatively, where administrative computer 26 is connected directly to user terminal 14, as shown in FIG. 2, the administrator may download the postage meter use information from the user terminal to the computer memory and thereafter generate accounting reports for display on monitor 50 and/or computer printer 30.

In the second alternative configuration shown in FIG. 3 the administrative computer 26 is part of a standalone unit including card read-write unit 28 and appropriate programming within the skill in the art to enable the computer to interact with the card read-write unit 28 for receiving postage meter use information from user cards 18 inserted into card read-write unit. In this configuration, it is contemplated that all user cards would be periodically collected from accountable entities, such as at the end of each accounting period, for reading in card reader 28 to transfer the postage meter use information from the user cards to the computer memory. Preferably, the user cards would be cleared by the administrator after the postage meter use information is transferred to computer 26 in order to commence the next accounting period.

The information transferred from the user terminal or the user cards to computer 26 constitutes an accounting for all use of meter 12 for the given accounting period. Advantageously, computer 26 may be programmed to store, display and/or print the postage meter use accounting information in a variety of formats. By way of example only and not by way of limitation, three accounting formats for displaying and/or printing the postage use information for a given accountable entity are shown in FIGS. 5 through 7. In each of these illustrations the accountable entity is shown as a hypothetical "Department 123-Credit Control." It should be understood that substantially the same accounting reports can also be generated with the user terminal system shown in FIG. 1.

As shown in FIG. 5, an accounting report may be generated showing the type and value of postage transactions undertaken by the accountable entity during the accounting period. As shown at 52, for example, the identity of the hypothetical accountable entity, "Department 123-Credit Control", is given. The accounting period 54, here "October 1986," is given and columns 56, 58, 60 respectively identify the print value, quantity and cumulative value for each type of postage item printed. In column 56, designated "Print Value," the value of each type of postage monitored is listed. In column 58 the quantity of items corresponding to the item types listed in column 56 is given, with a cumulative value printed for each type of item set forth in column 60. As shown, at the bottom of columns 58 and 60 quantity and money values 62 are given.

A second example accounting report is shown in FIG. 6. In this example a daily summary of activity is given. Columns 64, 66, 68 indicate the date, quantity and total value of postage items printed by the hypothetical Department 123 during the accounting period, here October 1986. This configuration takes advantage of the clock provided within user terminal 14 and/or card 18 to store information on a daily basis. For any given date listed in column 64, the total quantity of items printed and their total money value are shown in columns 66 and 68, respectively. Of course, the period totals can be given as shown on line 70.

Referring now to FIG. 7, there is shown a third example of an accounting report in accordance with the invention. This more comprehensive reporting format gives a daily summary of all postage meter usage for the period, including the quantity of specific postage item values printed on any given day during the period. In addition, the more extensive memory capacity of computer 26 is utilized to generate cumulative year to date usage information from prior period information. Once again in FIG. 7 the usage of the hypothetical Department 123 for the period October 1986 is shown. In column 72 each date on which use of the postage meter occurred is displayed. In columns 74 and 76 the quantity of particular postage item values of interest printed on the corresponding date of column 72 are shown. Column 78 shows the quantity of other types of postage items making up the remaining value of postage printed on that day. Column 80 lists the total monetary value of all postage printed on each day listed in column 72. Once again, the total quantity and dollar value figures for the period are shown on line 70. As shown on line 82, it is contemplated that the computer could be programmed to provide, on a year to date basis, a running total of the quantity and total monetary value of postage printed. programming for a year to date tabulation based on prior periodic reports within the computer memory is within the skill in the art.

Of course, it is contemplated that item values, etc., other than those shown in the foregoing illustrations may be desired. It is also contemplated that other report formats may prove desirable or useful such as, for example, monthly or year end reports of meter usage by all departments.

Referring now to FIGS. 8A through 8D, a flow chart illustrating an appropriate decision making process for user terminal 14 is there set out. For convenience, the flow chart shown is FIGS. 8A through 8D assumes that postage meter 12 has ascending and piece count registers; that user card 18 has budget amount, debit limit and end of accounting period registers; and that user terminal 14 ("UT") has a UT ascending register, a UT piece count register, user identification ("user ID") postage spent and piece count registers, a postage spent aggregate register, a piece count aggregate register, an initial meter ascending register, an initial meter piece count value register, and a register for current ascending register value. For simplicity, the flow chart also assumes a system having only administrator and user cards with the budget and debit limit fields operational.

Figure 8A:
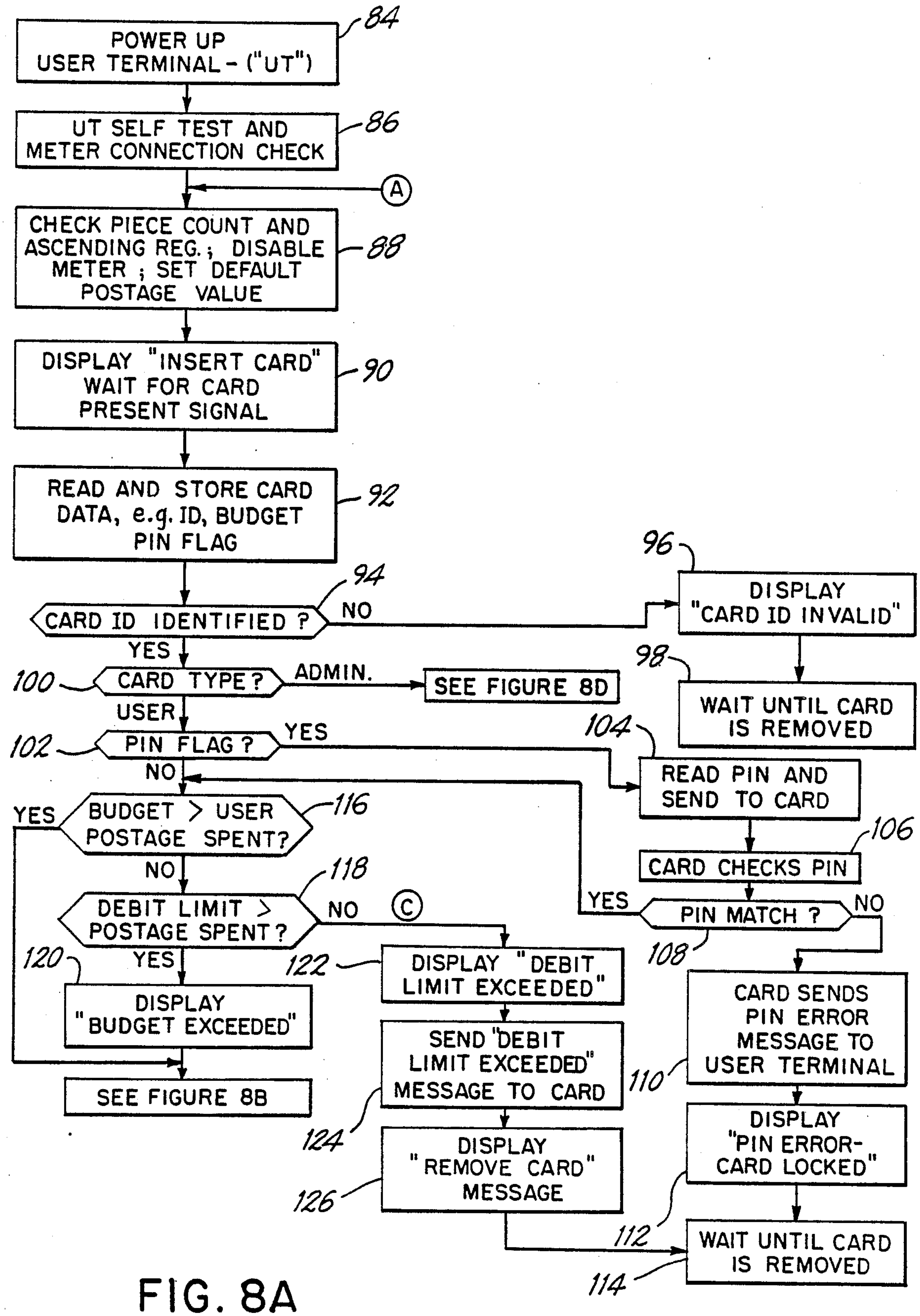
FIGS. 8A through 8D constitute a flow chart illustrating one possible user terminal decision-making process for a postage meter accounting system in accordance with the present invention.

Referring now to FIG. 8A, at steps 84 and 86 the user terminal is powered up and a user terminal self-test check is executed. The user terminal then checks the user terminal piece count and ascending register values against the corresponding meter values, disables the meter and sets a default postage value. Thereafter, the user terminal displays an "INSERT CARD" message and awaits presentation of a card (step 90).

Upon presentation of a card the user terminal at step 92 reads and stores card data such as the user identification number, budget amount and the user personal identification number flag. At decision step 94 the user terminal determines whether a card identification has been provided. If not, a "CARD ID INVALID" message is displayed (step 96) and the user terminal waits for the card to be removed (step 98), whereupon the user terminal returns to point A of the flow chart shown in FIG. 8A. If, however, a proper card identifier is found, the user terminal determines at step 100 whether an administrator or user card is disposed in the card read-write unit. If the card is an administrator card the user terminal proceeds directly to the administrative routine illustrated in FIG. 8D.

If, on the other hand, a user card has been presented the user terminal determines (step 102) by reading the personal identification number ("PIN") flag whether a personal identification number is required. If so, the user reads the PIN entered on the user terminal keyboard and sends the PIN to the card (see step 104), which checks the accuracy of the PIN (step 106). The card and user terminal permit the user three attempts to enter a valid PIN. If no valid PIN has been entered after three attempts, the card sends a PIN error message to the terminal indicating that the card is now locked, whereupon the user terminal displays a message such as "PIN ERROR-CARD LOCKED" and waits for the locked card to be removed from the card read-write unit (see steps 108, 110, 112, 114). After the card is removed, the user terminal returns to point A in the flow chart.

Where no PIN is required or a PIN match has been found, the user terminal determines whether the budget amount is greater than the user's postage spent amount (step 116). If not, the user terminal determines whether the debit limit exceeds the user's postage spent amount (step 118). Where the amount of postage spent by the user exceeds the budget amount but not the debit limit the user terminal displays a message such as "BUDGET EXCEEDED" but does not otherwise inhibit meter use (step 120). Where the debit limit has been reached, the user terminal displays a message such as "DEBIT LIMIT EXCEEDED," sends a debit limit exceeded message to the card, displays a "REMOVE CARD" message, and waits for the card to be removed (see steps 118, 122, 124, 126 and 114).

Figure 8B:
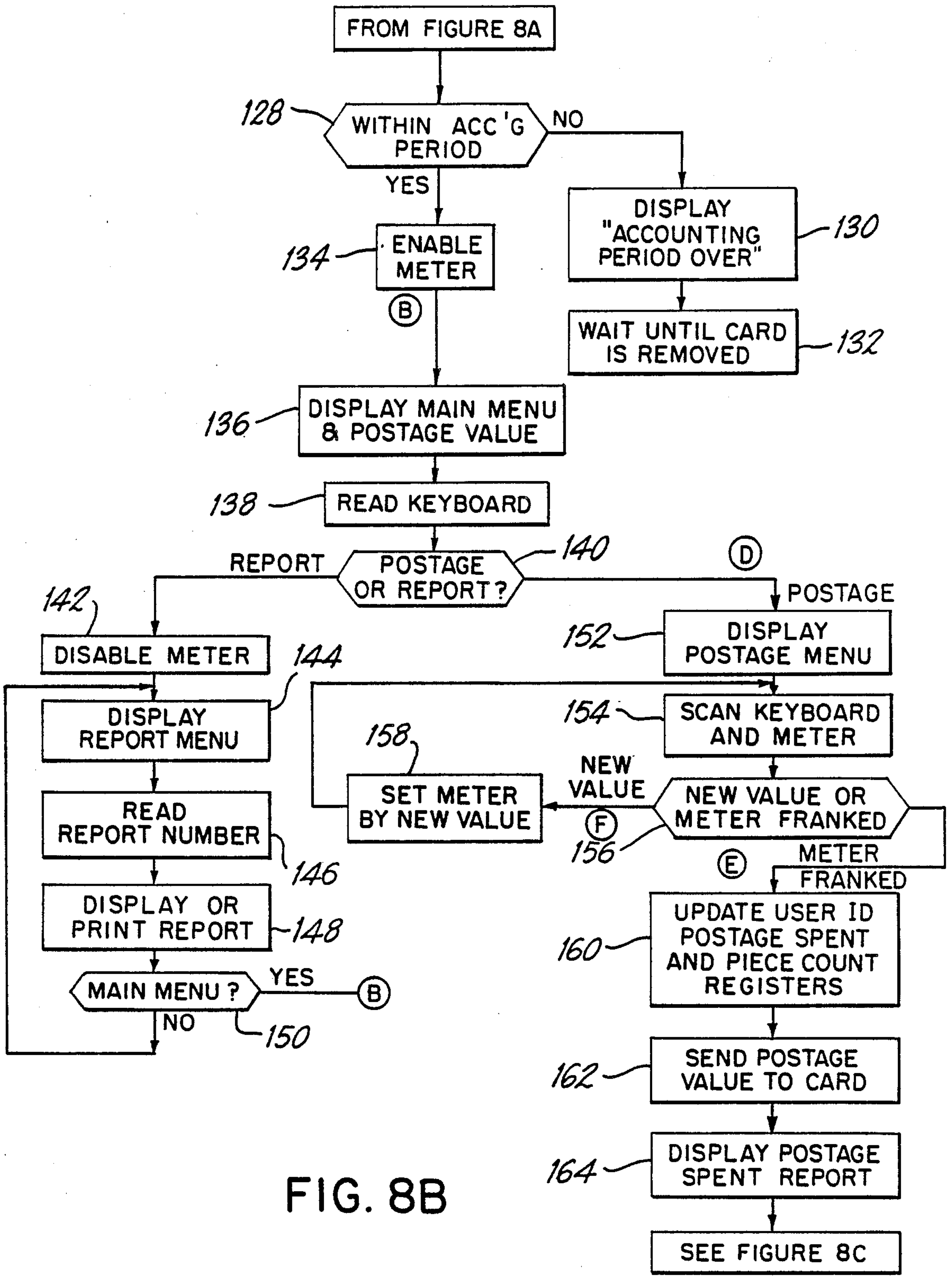

Provided the debit limit has not been exceeded, the user terminal next determines whether the card accounting period is current. Referring now to FIG. 8B, if the card does not conform to the current accounting period the user terminal displays a message such as "ACCOUNTING PERIOD OVER" and waits until the card is removed (see steps 128, 130, 132). After the card is removed the user terminal returns to point A of FIG. 8A. Although not here illustrated it is also contemplated that numerous other conditions could also be illustrated. By way of example only, the user terminal could test for a day time only flag to determine whether the card is being used during an authorized period of the day.

Where the card accounting period is current, the user terminal enables the meter and displays a main user menu and the current setting of postage value on the meter (see steps 128, 134, 136). The user terminal then reads the keyboard and determines whether postage printing or reporting functions are to be performed (see steps 138, 140). If reporting is to be done, the user terminal disables the postage meter and displays a menu of different types of reports that can be generated. A user report format is selected by number, a report is displayed or printed and the user terminal inquires whether the user desires to return to the main menu (steps 142, 144, 146, 148, 150). If not, the user terminal returns to the report menu display (step 144). Otherwise the user terminal returns to the main menu display (step 136) indicated as point B. As will be readily appreciated, the present illustration assumes display and printing of accounting information by user card holders. Of course, this capability could be restricted to the administrator or shared by the user and administrator, e.g. user able to print only that user's information with administrator able to print information pertaining to all users.

Referring again to step 140, if postage is to be printed the user terminal displays a postage menu, scans the keyboard and meter, and inquires whether the meter has been franked or whether a new meter value has been or is to be set (steps 152, 154, 156). If a new value is set the user terminal returns to scanning the keyboard and meter and inquires whether the meter has been franked (steps 158, 154, 156). Once the meter is franked, the user terminal updates the user ID postage spent and piece count registers, transmits the postage value to the card, and displays a postage spent report on the user terminal display (see steps 160, 162, 164).

Figure 8C:
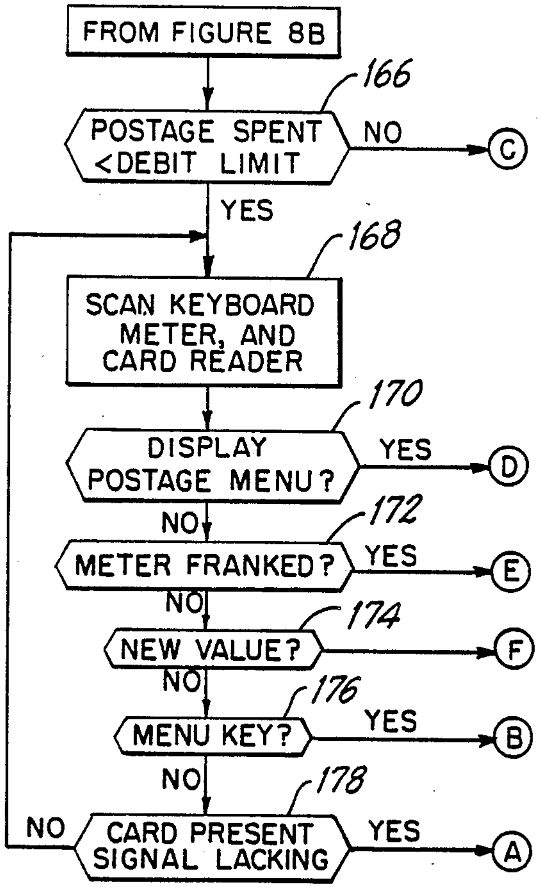

Referring now to FIG. 8C, the user terminal next determines (step 166) whether the postage spent by the user is below the user's debit limit. If not, the user terminal returns to point C of FIG. 8A (step 122) to display a "DEBIT LIMIT EXCEEDED" message and wait for the card to be removed.

Provided the user debit limit has not been exceeded, the user terminal scans the keyboard, meter and card reader for a time and inquires whether the user desires to display the postage menu (steps 168, 170). If yes, the meter returns to Point D on the flow chart in FIG. 8B (step 152). If not, the user terminal determines whether the meter has been franked (step 172) and, if so, returns to point E on the flow chart of FIG. 8B (step 160) to update the user terminal and card registers. If the meter has not been franked the user terminal inquires whether a new value is to be set (step 174) and, if so, returns to point F (step 158) of the flow chart shown in FIG. 8B. If no new value is to be set, the user terminal inquires (step 176) whether the user desires to view the main menu and, if so, returns to Point B (step 136) on the flow chart of FIG. 8B. If the main menu is not to be displayed the user terminal tests the signal corresponding to the presence or absence of a card in the card read-write unit (step 178). If the card is still present the user terminal returns to scanning the keyboard, meter and card reader and awaits further instructions from the user. If the card has been removed the user terminal returns to point A (step 88) of the flow chart shown in FIG. 8A.

Figure 8D:
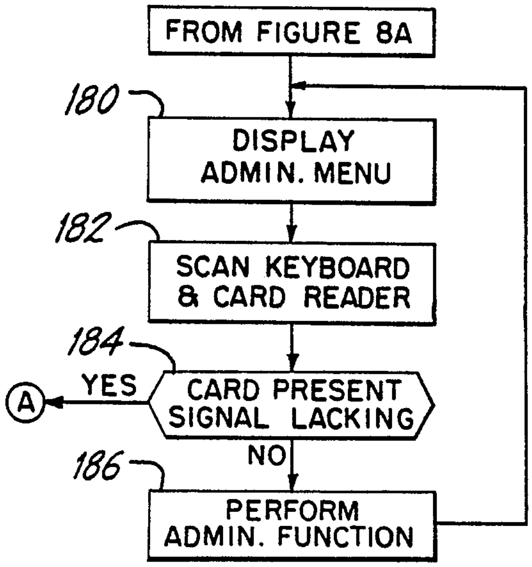

When it is determined that an administrator card has been inserted into the card read-write unit (see FIG. 8A at step 100), the user terminal performs the routine illustrated in the flow chart of FIG. 8D. As there shown, the user terminal displays an administrator menu and scans the keyboard and card reader for instructions (steps 180, 182). Once an administrative function is selected the user terminal tests the card present signal to determine whether a card has been inserted into the card read-write unit (step 184) within a preset time period. If so, the administrative function is performed (step 186) and the user terminal returns to displaying the administrator menu (step 180). By way of example only, the selected administrator function might be to reset a user identification number, requiring that a user card be inserted into the card read-write unit for updating. If no card is presented in a timely fashion the user terminal would return to point A (step 88) of the flow chart shown in FIG. 8A. Of course, administrative functions might also include displaying and/or printing accounting reports.

The foregoing discussion and the accompanying flow chart of FIGS. 8A through 8D is intended to be illustrative of the basic principles of the present invention and is not restrictive thereof. As will be readily appreciated, numerous variations from and additions to the specific steps of the flow chart may be made in keeping with the various embodiments and modifications expressly disclosed and contemplated herein.

Thus, the present invention provides a versatile departmental postage meter accounting system. The system in accordance with the invention advantageously may be retro-fitted to existing electronic postage meters in the field. Indeed, since the vault always remains within the meter and only an external electrical connection to the supplemental accounting system is provided, the present system is consistent with and should not conflict with existing postage meter regulations. Of course, it is contemplated that in the future it may be desirable to provide the meter, control unit and card read-write unit as a single integrated meter. However, since the vault and postage printing functions remain within the meter and are recharged in a traditional manner, integrating the control unit and card read-write unit into the meter housing should still comply with existing postal regulations.

In addition, the preferred embodiment including an administrative computer permits more extensive accounting than could be achieved with a card and user terminal accounting system and provides added versatility to the types of accounting reports that can be generated.

To the extent not already indicated, it will be understood that the invention in its broader aspects is not limited to the specific embodiments herein shown and described but departures may be made therefrom, within the scope of the accompanying claims, without departing from the principles of the invention and without sacrificing its chief advantages.

What is claimed is:

1. A postal accounting system comprising:

an electronic postage meter, said postage meter having accounting registers therein for postage funds;

at least one user integrated circuit card means for accessing said postage meter for use, said user card means including a microprocessor and memory, said user card memory further including a header section and a transaction table;

use terminal means connected to said postage meter for controlling said postage meter and for storing and processing postage meter use information, said user terminal means including an integrated circuit card read-write unit for receiving and communicating with said user card means, said user terminal means activating said postage meter for use when an authorized one of said user card means is placed into said card read-write unit, said user terminal means transmitting said postage meter use information to said user card means for storage in said transaction table, and wherein said postage meter use information relates to each transaction completed by said postage meter and includes predetermined accounting information in addition to a debit amount for each transaction.

2. A postal charge accounting system comprising:

an electronic postage meter, said postage meter having accounting registers therein for postage funds;

user integrated circuit card means for accessing said postage meter for use, said user card means including a microprocessor and memory, said user card memory further including a header section and a transaction table;

user terminal means connected to said postage meter for controlling said postage meter and for recording and processing postage meter use information, said user terminal means including a first integrated circuit card read-write unit for receiving and communicating with said user card means, said user terminal means activating said postage meter for use when an authorized one of said user card means is placed into said first card read-write unit, said user terminal means transmitting said postage meter use information to said user card means for storage in said transaction table, wherein said postage meter use information relates to each transaction completed by said postage meter and includes predetermined accounting information in addition to a debit amount for each transaction;

administrative computer means connected to a second integrated circuit card read-write unit for receiving and communicating with said user card means, said administrative computer means receiving said postage meter use information from said user card means and generating a postage meter use report therefrom.

3. A postal charge accounting system comprising an electronic postage meter, said postage meter having accounting registers therein for postage funds;

user integrated circuit card means for accessing said postage meter for use;

user terminal means connected to said postage meter for controlling said postage meter and for recording and processing postage meter use information, said user terminal means including an integrated circuit card read-write unit for receiving and communicating with said user card means, said user terminal means activating said postage meter for use when an authorized one of said user card means is placed into said card read-write unit;

administrative computer means connected to said user terminal means for receiving said postage meter use information from said user terminal means and generating a postage meter accounting report.

4. The system according to claim 3 wherein said user card means includes a microprocessor and memory, said user card memory having a header section and a transaction table, said user card means receiving said postage meter use information from said user terminal means and storing said postage meter use information in said transaction table, wherein said postage meter use information relates to each transaction completed by said postage meter and includes predetermined accounting information in addition to a debit amount for each transaction.

5. The system according to claim 1 wherein said user card header section includes a card identification number, a user identification number, a user card identifier, a user terminal identification number, an accounting period beginning date, an accounting period ending date, a debit limit counter, an error type register and counter, and at least one item value entry.

6. The system according to claim 5 wherein said user card transaction table includes date, at least one item value counter corresponding to said header section item value entry, an other type piece counter and an other type amount register.

7. The system according to claim 1 further comprising administrator integrated circuit card means for supervising said user card means and for obtaining access to said postage meter use information stored in said user terminal means, said administrator card means being inserted into said card read-write unit.

8. The system according to claim 7 wherein said administrator card means includes a microprocessor and memory having an administrator header section and an administrator transaction trace, said administrator header section including a card identification, an administrator number, an administrator card identifier, and a user terminal identifier.

9. The system according to claim 8 wherein said administrator card authorizes access and revision to said user card header section and transaction table.

10. The system according to claim 7 wherein said user terminal further includes a display for displaying said postage meter use information.

11. The system according to claim 10 further comprising a printer connected to said user terminal for printing a postage meter use transaction receipt.

12. The system according to claim 11 further comprising an electronic postage scale connected to said user terminal.

13. The system according to claim 1 wherein said user terminal means further includes a microprocessor, erasable programmable read only memory and non-volatile memory, said erasable programmable read only memory storing owner non-variable application program information and said non-volatile memory storing said postage meter use information and owner variable application program.

14. The system according to claim 2 wherein said user terminal means further includes a microprocessor, erasable programmable read only memory and non-volatile memory, said erasable programmable read only memory storing owner non-variable application program information and said non-volatile memory storing said postage meter use information and owner variable application program.

15. The system according to claim 3 wherein said user terminal means further includes a microprocessor, erasable programmable read only memory and non-volatile memory, said erasable programmable read only memory storing owner non-variable application program information and said non-volatile memory storing said postage meter use information and owner variable application program.

16. The system according to claim 13 further comprising administrator integrated circuit card means for accessing and revising said owner variable application program and said postage meter use information.

17. The system according to claim 16 wherein said postage meter use information includes, for each postage meter transaction, the quantity of preset postage item values printed, the number of other type pieces printed and the value of other type items printed.

18. The system according to claim 17 further comprising service integrated circuit card means for accessing and revising said administrator card.

19. The system according to claim 13 further comprising service integrated circuit card means for accessing and revising said erasable programmable read only memory and said non-volatile memory.

20. The system according to claim 13 further comprising program integrated circuit card means for revising said owner non-variable application program information and said owner variable application program.

21. The system according to claim 11 wherein said administrator card permits a display and/or printout of said postage meter use information stored in said user terminal.

22. The system according to claim 17 wherein said postage meter use information includes, for storage in said user terminal means, a system configuration table, a summary transaction table for each user, accumulative summary accounting totals, accounting period information, postage item values, postage meter data and terminal status information.

23. The system according to claim 22 wherein said user terminal activates said postage meter after said user card means is inserted into said card read-write unit and said user terminal confirms said user card means is valid.

24. The system according to claim 23 wherein said user terminal detects unauthorized meter use by comparing ascending register value of said postage meter to a corresponding value maintained in said user terminal.

25. The system according to claim 1 wherein said meter was previously in use and said user terminal means has been connected to said meter through a communication link and said card means has been added to form the system.

26. The system according to claim 2 wherein said meter was previously in use and said user terminal means, said card means and said administrative computer means have been retrofitted to form the system by connecting said user terminal means to said meter through a communications link.

27. The system according to claim 1 wherein said terminal means records and processes said postage meter use information for every transaction completed by said postage meter, and said user card means process and store said postage meter use information for the transactions completed by said postage meter when said authorized one of said user card means is in said card read-write unit.

28. The system according to claim 27 wherein said user card means sorts and collates said postage meter use information before storing the information into said transaction table.

29. The system according to claim 1 wherein at least one authorized user card means is provided to each of a plurality of accountable entities for controlling and monitoring use of said postage meter by said accountable entities.

30. The system according to claim 29 wherein said postage meter use information includes for each postage meter transaction, postage value printed during said transaction and an identity of said accountable entity effecting said transaction.

31. The system according to claim 1 wherein said terminal means and said user card means are retrofitted to an existing one of said postage meter.

* * * * *